Aug. 22, 1933.    A. J. NORTHEY    1,923,500
ROTARY INTERNAL COMBUSTION ENGINE
Filed March 18, 1930    2 Sheets-Sheet 1

A. J. Northey
INVENTOR

By: Marks & Clerk
ATTYS.

Aug. 22, 1933.            A. J. NORTHEY            1,923,500
                ROTARY INTERNAL COMBUSTION ENGINE
                  Filed March 18, 1930       2 Sheets-Sheet 2
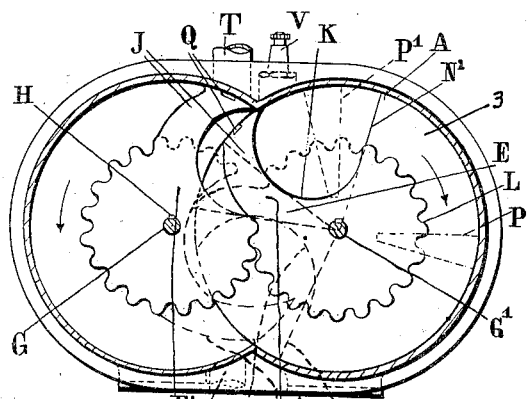
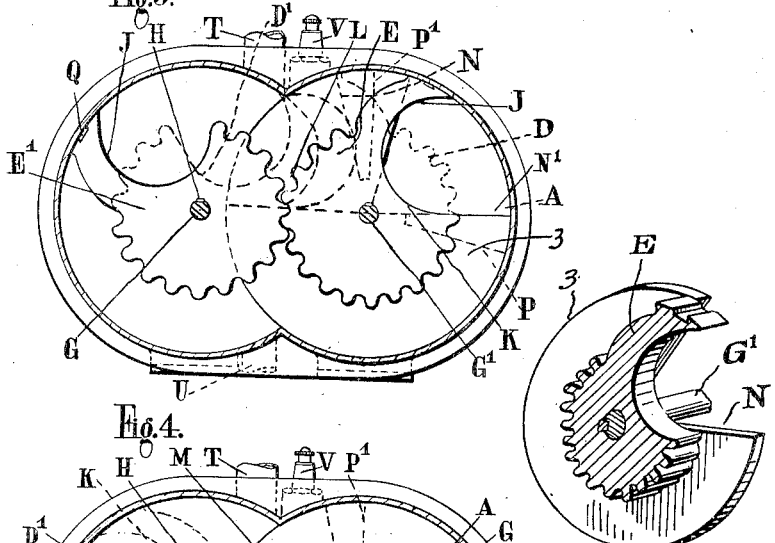
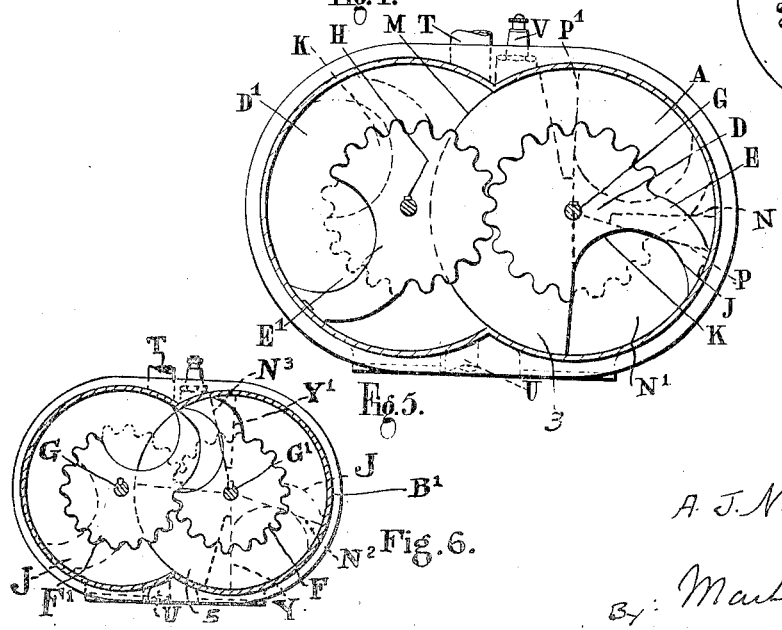
A. J. Northey
INVENTOR Patented Aug. 22, 1933

1,923,500

UNITED STATES PATENT OFFICE 1,923,500

ROTARY INTERNAL COMBUSTION ENGINE

Arthur John Northey, Parkstone, England

Application March 18, 1930, Serial No. 436,857, and in Japan March 29, 1929

1 Claim. (Cl. 123—12)

This invention relates to rotary internal combustion engines of the type comprising a number of double chambers arranged one behind the other, each of said chambers being provided with a pair of co-acting pistons, one pair of which serves for compressing the combustible mixture, while the remaining pairs are driven by the combustion of the said combustible.

An internal combustion engine of this type is described in the specification of my co-pending application No. 218,038 and comprises a pair of these chambers which function respectively as a compression chamber and an explosion chamber, whilst the driving pistons in the latter are provided with projecting arms or blades, are recessed on their periphery to enable such blades to perform a complete revolution, and are so arranged and positioned relatively to one another that, upon the combustible mixture being ignited, the force of the explosion acts upon both pistons and drives them simultaneously.

The passage of the combustible mixture from the compression chamber to the explosion chamber, according to this prior specification is controlled by means of ports provided in discs secured or formed on the sides of one of the pistons in each chamber.

The present invention is a development of the engine described in this prior specification and the object of the invention is to increase the efficiency of such an engine by ensuring a more uniform running thereof.

In order that the invention may be better understood I will now describe same with the aid of the accompanying drawings, in which:—

Figure 3 is a section taken on the line III—III of Figure 2 looking in the direction of the arrows and showing the relative positions of the rotors in the compression chamber and the forward explosion chamber when those in the compression chamber commence to draw in a new charge and to compress a charge which has already been admitted.

Figure 4 is a similar section to Figure 3, showing the relative positions of the rotors in the compression chamber and forward explosion chamber after compression has taken place and when the ports leading from said chambers are about to open and thus allow communication through the transfer passage.

Figure 5 is a similar section to Figures 3 and 4 showing the relative positions of the rotors in the compression chamber and forward explosion chamber after the charge has been transferred to the forward explosion chamber and the ports leading to the communicating passage closed.

Figure 1:
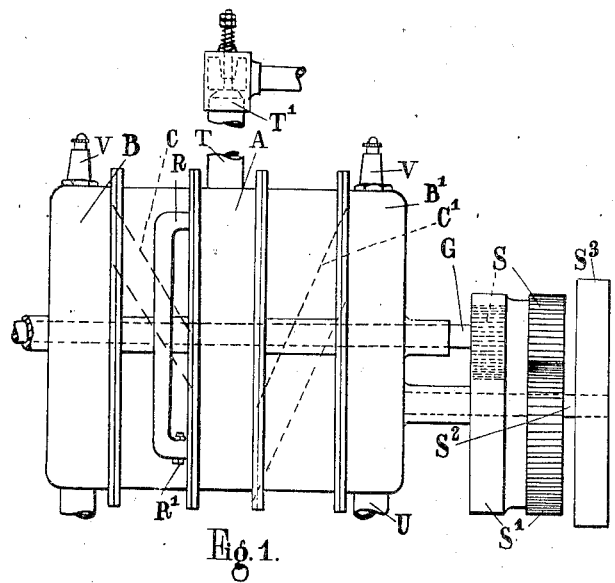
Figure 1 is a side elevation.
Figure 2:
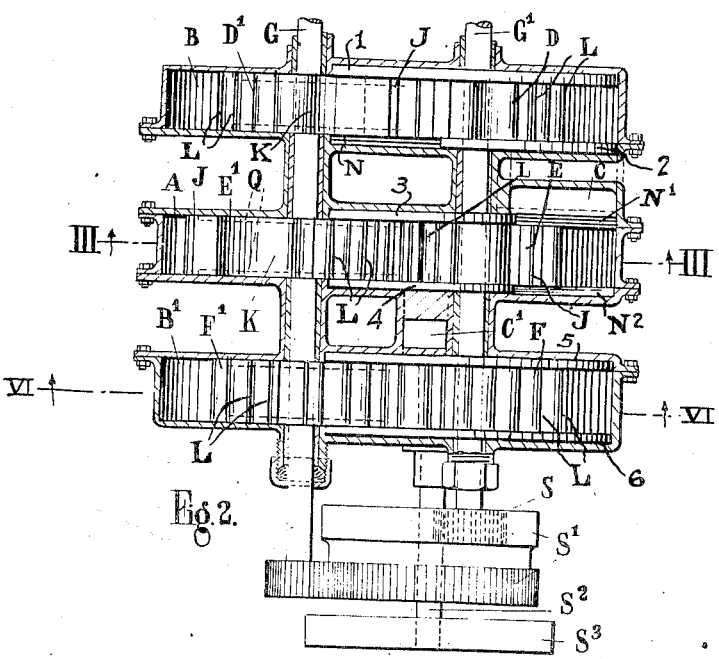
Figure 2 is a plan with the top half of the casing removed.

Figure 6 is a section taken on the line VI—VI of Figure 2 looking in the direction of the arrows and showing the relative positions of the rotors in the compression chamber and rearward explosion chamber when the compression rotors are in the position shown in Figure 5 and the ports leading from said chambers to the communicating passage are about to be opened for transferring a second charge from the compression chamber to the rearward explosion chamber.

Figure 7 is a perspective view of a rotor and one of its ported discs.

The chambers A, B and B¹ are arranged side by side, each being in the form of a double chamber somewhat like that of an ordinary rotary gear pump, that is, each half of such double chamber is a partial cylinder. The compression chamber A is connected to the explosion chambers B and B¹ placed on each side thereof by passages C, C¹, which lead from one chamber A to the other chambers B, B¹.

Within each of these double chambers A, B, B¹ are provided rotors D, D¹, E, E¹, F, F¹ carried on parallel shafts G, G¹ and secured thereto by keys H or other means, the rotors being of a diameter to give a predetermined area between same and the wall of the chamber. These rotors D, D¹, E, E¹, F, F¹ are each formed with one or more blades J, which project outward to make a sliding fit against the inner wall and sides of the double chambers A, B, B¹. Recesses or pockets K are formed on the peripheries of each rotor to enable the blades J to perform the complete revolution. Teeth L, formed on the periphery of the rotors, mesh with each other.

The rotors E, E' in the compression chamber A are arranged the opposite way to those in the explosion chambers B and B'.

The rotors, D, E, F are each provided with discs on the sides thereof, the rotor D having a pair 1 and 2, the rotor E, a pair 3 and 4 and the rotor F, a pair 5 and 6. The discs 2, 3, 4, and 5 are provided with ports N, N', N² and N³ respectively, which ports are exactly similar in shape and size and are disposed in the same position relative to their respective rotor blades. The remaining discs 1 and 6 are merely provided for sealing the explosion chambers and no ports are formed therein. The ports N' and N² in the discs 3 and 4 on either side of the compression rotor E are arranged exactly opposite one another and control the opening and closing of ports P and Y leading from the compression chamber into the communicating passages C and C' respectively. The opposite ends of said passages C and C' are controlled by the discs 2 and 5 which open and close ports P' and Y' leading from said passages into the explosion chambers B and B' respectively.

The ports N, N', N² and N³ in the discs and the ports P, P', Y, Y' in the walls of the chambers are of such relative area as will enable the latter to remain open a predetermined period and thus allow of a proper transfer of the compressed gas from the compression chamber A to the explosion chambers B, B' without excessive loss of pressure. The ports in the disc and wall of one explosion chamber on one side of the compression chamber A are in advance of those on the other side. The ports N, N', N² and N³ in the discs 2, 3, 4 and 5 and the ports P, P¹, Y, Y' communicating with passages C, C¹, are arranged so that compressed gas is transferred from the compression chamber A to one explosion chamber B before compressed gas is transferred to the other explosion chamber B¹.

Packing Q is provided on the tips and sides of the blades J and sides of the rotors D¹, E¹, F¹ to prevent the escape of the gases.

A by-pass R leads from the top of the compression chamber A to the bottom thereof, a cock R¹ being provided therein where found most suitable.

Pinions S are provided on the shafts G, G¹ and they mesh respectively on the outside and inside of the spur wheel S¹ on a counter shaft S², on which is secured a flywheel and/or pulley S³.

The inlet pipe T leads into the top of the compression chamber A from the carbureter, and is fitted with a non-return valve T¹.

Exhaust pipes U lead from the bottom of each explosion chamber B, B¹.

A sparking plug V is fitted in the top of each explosion chamber B, B¹.

I will now describe the operation of my engine with reference, more particularly to Figures 3, 4, 5 and 6.

In the position shown in Figure 3, the blades J of the compression rotors E, E' are about to separate in the direction of the arrows, thus drawing in the fuel or mixture between the blades from the carbureter through the pipe T and non-return valve T'. At the same time, fuel or mixture in front of the blades which has previously been admitted, is compressed. Further, rotation of the compression rotors will bring the blades J into the position shown in Figure 4 in which position the port N' in the disc 3 of compression rotor E is about to uncover the port P leading into passage C communicating with the explosion chamber B. At the same time, rotor D in explosion chamber B has moved round with its disc 2 so as to bring port N into the same position relative to the port P' at the other end of passage C as port N' is to port P. Continued rotation of the rotors E and D will cause the ports P and P' to be opened simultaneously by the ports N' and N thus allowing the compressed gas to pass along the passage C into the explosion chamber B between the blades of the rotors D, D'. The ports P, P' remain open for a predetermined period whilst the ports N', N are passing over them, after which they are closed by the discs 2 and 3 (see Figure 5) and the mixture in chamber B immediately fired, the resultant explosion driving the rotors D, D' in opposite directions. Immediately the ports communicating with explosion chamber B are closed, the ports on the other side of the compression chamber A are opened to allow a second charge of compressed gas to pass through the passage C' to the explosion chamber B'. This will be clearly understood from Figure 6 which shows the position of the other pair of working rotors F, F' when the compression rotors E, E' are in the position shown in Figure 5 that is immediately after the ports P and P' have been closed by their respective discs N' and N. As will be seen from Figure 6, the port N² in the disc 4 is just about to start uncovering the port Y leading from the compression chamber into the passage C' communicating with the explosion chamber B' whilst the port N³ in the disc 5 of the working rotor F is in the same position relatively to the port Y' leading from the working cylinder B' into the passage C' which port is in direct line with the port P' in the other working cylinder B. Further rotation of the compression rotor and working rotor F will cause the ports Y and Y' to be uncovered in a similar manner to the ports P, P' and a second charge of mixture to be discharged into the explosion chamber B' between the blades of the working rotors F, F'. The ports Y, Y' are then closed by their respective discs 4 and 5 and the mixture is immediately fired, the compression rotors now being once again in the position shown in Figure 3 from whence the cycle of operations is repeated. It will thus be seen that two impulses are given for each revolution. In the compression chamber, induction and compression take place simultaneously, and in one explosion chamber, expansion, scavenging, and exhaust take place simultaneously, to be followed by simultaneous expansion, scavenging and exhaust in the other explosion chamber.

The engine may be throttled by manipulating the cock R¹, allowing a quantity of the mixture to pass from the compression side of the blades to the induction side, thus reducing the degree of compression of the gas which passes to the explosion chambers. This renders it unnecessary to throttle the carbureter and consequently the creation of a partial vacuum.

The exact design and the metals of which the engine would be constructed, and details other than hereinbefore mentioned and incidental to the proper working of the engine, would be as found in good engineering practice.

Having now described my invention, what I claim as new and desire to secure by Letters Patent is:—

In a rotary internal combustion engine comprising a number of double chambers arranged one behind the other, each of said chambers being provided with a pair of coacting pistons, one pair of which serves for compressing combustible mixture whilst the remaining pistons are driven by the combustion of said mixture, the provision of three such double chambers the compression chamber being arranged between the explosion chambers, a passage leading from one side of the compression chamber to the first explosion chamber, a second passage leading from the other side of said compression chamber to the second explosion chamber, the first-mentioned passage being disposed in advance of the second passage, a pair of ported discs arranged one at each end of the first-mentioned passage leading from the compression chamber to the first explosion chamber and fixed to one piston of each pair of compression and explosion rotors respectively, the said discs opening the ends of the said passage to permit a charge of mixture to be transferred from the compression chamber to the first explosion chamber after which said passage is closed and the mixture fired, and a second pair of ported discs arranged one at each end of the second transfer passage leading from the compression chamber to the second explosion chamber and fixed to one piston of each pair of compression and explosion rotors respectively, the said discs opening the ends of said second passage after the first passage has been closed and the charge in the first explosion chamber fired, to permit a charge of mixture to be transferred from the compression chamber to the second explosion chamber after which the said passage is closed and the mixture fired, as a result of which two impulses instead of one are imparted to the engine for each revolution.

ARTHUR JOHN NORTHEY.